United States Patent [19]

Amundson et al.

[11] 3,927,260

[45] Dec. 16, 1975

[54] SIGNAL IDENTIFICATION SYSTEM

[75] Inventors: Robert M. Amundson, Bluefield, W. Va.; Robert M. Brown, Woodbridge, Va.

[73] Assignee: Atlantic Research Corporation, Alexandria, Va.

[22] Filed: May 7, 1974

[21] Appl. No.: 468,007

[52] U.S. Cl. .............. 179/1 MN; 307/232; 328/109

[51] Int. Cl.$^2$ .......................................... H04M 3/22

[58] Field of Search ........... 179/1 MN, 1 VC, 2 DP, 179/15 AS, 15 BF, 1 SP, 81 C, 84 L, 84 VF, 179/175.2 C; 324/77; 307/232, 236; 328/109, 328/110, 118, 120

[56] References Cited

UNITED STATES PATENTS

| | | | |
|---|---|---|---|
| 2,761,897 | 9/1956 | Jones | 179/1 VC |
| 2,974,281 | 3/1961 | Feldman | 179/2 DP |
| 3,448,215 | 6/1969 | Engel | 179/1 MN |
| 3,524,935 | 8/1970 | Gonsewski et al. | 179/2 DP |
| 3,767,860 | 10/1973 | Brown | 179/1 MN |
| 3,851,112 | 11/1974 | Kusan | 179/84 VF |

*Primary Examiner*—Kathleen H. Claffy
*Assistant Examiner*—Randall P. Myers
*Attorney, Agent, or Firm*—Finnegan, Henderson, Farabow & Garrett

[57] ABSTRACT

The embodiments of the signal identification system which are disclosed distinguish between signal conditions on a communication line, as for example, between noise and modulated data signals and between noise, modulated data, voice, and a no signal condition, and identify the particular type of signal condition present.

In a particular system embodiment disclosed, the energy in the input signal is also examined to avoid the possibility of channelized FSK data being incorrectly classified as noise by the main system. A commutating filter is stepped across the FDM band and the energy at each step is compared with the energy at the next preceding step. The difference in energy level derived at each step is accumulated and compared with a preset level. If the accumulated energy level exceeds the preset level during the sweep, the result can be used to supersede an erroneous noise identification with a correct identification of modulated data.

10 Claims, 4 Drawing Figures

SIGNAL IDENTIFICATION SYSTEM

BACKGROUND OF THE INVENTION

The present invention relates to a system, for use with communication networks and systems, which discriminates or distinguishes between noise and modulated data signals.

It is often necessary or desirable to monitor a communication line to determine how and to what extent the line is being used. At audio frequencies, such as are used for the sending and receiving of telephone and data signals, the latter including telegraph signals within its scope, it is quite common to provide a customer with a line or circuit which is used for both voice and data communication needs. Because the charge or tariff is determined by the grade of circuit provided, and not necessarily the use to which such circuit is put, it results in an inefficient, as well as an expensive, practice to employ a data circuit when the transmissions are primarily voice. It is preferable, therefore, to be able to monitor the use to which a customer is putting his circuit and appropriately switch to a lower grade curcuit if voice transmissions form most of his communications.

Similarly, in the routing of audio signals, it is often required that the transmission be monitored at a communication center or terminal location and directed to a voice user or a data terminal, depending on whether voice or data, respectively, is on the line. While an operator can listen and manually perform the required switching, it leads to greater efficiencies and substantially eliminates the likelihood of error if the operator can be automatically informed of the type of signals which are being carried over his communication circuits. If desired, automatic switching or routing can also be performed. Additionally, the capability of being able to monitor automatically communications circuits lends itself readily to the continuous monitoring and the ability to make a recording of the utilization of the circuit for future reference, as well as traffic analyses.

In U.S. Pat. No. 3,767,860, issued Oct. 23, 1973, to Robert M. Brown, entitled "Modulation Identification System", and assigned to the assignee of the present application, there is disclosed a unique modulation identification system which distinguishes between voice and data signals in the communication line or whether there is an absence of signals — commonly known as the "no-signal" condition. As disclosed therein, the input signals, which have not been demodulated and therefore are in an AC format, be they voice, data, or noise signals, are first shaped to provide a pulse train in which the edges of the pulses correspond to the zero-crossings of the input signals. The pulse trains are then processed to actuate the appropriate indicating circuit.

While the aforesaid system performs satisfactorily in distinguishing between input voice signals, data signals and a no-signal condition, it classifies a noise input as data. This classification of noise is at times acceptable, but an exact classification can be desirable and in some instances a necessity. Thus, there is a need to be able further to distinguish or discriminate between modulated data and noise.

The problem in attempting to distinguish between the two is that over a limited bandwidth, as might be encountered in a data communication network, the data and noise can have essentially the same energy spectrum. In fact, to the casual observer, the oscilloscope waveforms for noise and modulated data appear essentially the same.

Presently, the function of ascertaining whether a transmission is data or noise is being attempted in several ways. In one approach, human operators listen to the demodulated signals. This requires the hiring and training of additional personnel for a job that can hardly be considered stimulating from the standpoint of the operator. It would seem that the efficiency of the operators would be quite low. The act of listening might also become a violation of the privacy of the individuals or companies who are using the communication circuit.

Another approach using human operators is the visual analysis of oscilloscope waveforms. This requires special training of the operators and operating experience before becoming adept at determining what is a noise signal in contrast to what is one of the myriad modulated signals that could be present. It would seem that this approach would result in a costly and inefficient use of personnel. Yet another approach being developed is Fourier analysis of the complex waveforms. The details of this approach have been made known, and the complexity of the required mathematical analysis will apparently require a computer dedicated solely to each analysis. The high cost of this approach is readily apparent, and the hardware limitations of currently available processing equipment may not allow satisfactory real time analysis.

The system described in copending U.S. application Ser. No. 442,237, entitled "Signal Identification System," filed on Feb. 13, 1974, and assigned to the same assignee as the present application, overcomes the problems of the prior art by providing electronic apparatus which automatically discriminates between noise signals and modulated data signals on a real time basis using novel techniques unlike those of the prior art. Considered in its broadest aspects, it can be used where there is a need to know whether noise or modulated data is being monitored without regard for the intelligence content, or whether there is unwanted noise on the line, all without interruption of any communication in progress and without having to take the line out of service. The system can also be incorporated with other apparatus for analyzing signals, including but not limited to the system disclosed in the aforesaid U.S. Pat. No. 3,767,860, when additional information about the signal content is desired.

In the development of the invention of the aforesaid copending application, it occurred that it might be possible to discriminate between noise and data if data was treated as being somewhat repetitious in character as opposed to the random character of Gaussian noise. By being repetitious did not mean that the signal repeated itself periodically for in such case known techniques, such as auto-correlation, could be used to make a determination and perhaps even extract the intelligence from the signal. In contrast, such system is not dependent on the data content per se, since analysis occurs prior to demodulation, but rather on a pattern or trait that makes the signal repetitious in some manner on a limited and preferably broad basis.

SUMMARY OF THE INVENTION

While the system described in the aforementioned copending application Ser. No. 442,237 displays excellent versatility in distinguishing modulated data, regardless of the type of modulation scheme employed, from noise and other signal conditions, the presence of frequency-division-multiplex (FDM) or channelized frequency-shift-keying (FSK) modulation can, at times, cause such system improperly to classify this type data as noise. The likelihood of this occurring is more pronounced when the FSK data is present in many channels simultaneously within the FDM band.

The present invention overcomes this problem by the provision of electronic apparatus which automatically supersedes the decision made by the system described in the aforementioned application when channelized FSK data is being received. Should such data be wrongly classified as a noise signal, the present invention overrides this decision and correctly classifies this input as a data signal.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

In accordance with the purposes of the invention, as embodied and broadly described herein, the system of this invention comprises means for providing a pulse train in response to excursions from a predetermined amplitude level in the signals applied to said communication line, means for sampling the pulse train at a varying rate and retaining temporarily the pulses which are sampled, means for selectively comparing the pulses retained in said sampling means during the sampling of the pulse train to determine whether there is an occurrence of predetermined digital states of the selected sampled pulses said pulse comparison occurring repetitively, means for measuring the occurrences of said predetermined digital states of said selected sampled pulses as determined by said comparing means, means responsive to the signals in the communication line for detecting the energy contained in said signals at a plurality of spaced frequencies in the frequency band of the data signals, means for comparing the level of the detected energy with a predetermined energy level, and means responsive to said measuring means and said energy level comparing means for providing an output indicative of the presence of data or noise in the communication line as determined by a predetermined magnitude of occurrences of predetermined digital states of said selected sampled pulses and a predetermined energy level in said detected energy.

Preferably, there are means for passing the energy contained in the signals at a plurality of spaced frequencies and a difference circuit for comparing the energy passed at said plurality of frequencies.

It is also preferred that there be means for accumulating a voltage in response to the difference in energy level passed at selected frequencies, and that the comparing means include a comparator for comparing the voltage of said accumulating means with a preset voltage level.

The invention consists in the novel circuits, constructions, arrangements, combinations, and improvements shown and described. The accompanying drawings, which are incorporated in and constitute a part of the specification, illustrate several embodiments of the invention and, together with the description, serve to explain the principles of the invention.

DESCRIPTION OF THE PREFERRED EMBODIMENT

Reference will now be made in detail to the present preferred embodiments of the invention, examples of which are illustrated in the accompanying drawings.

Figure 1:
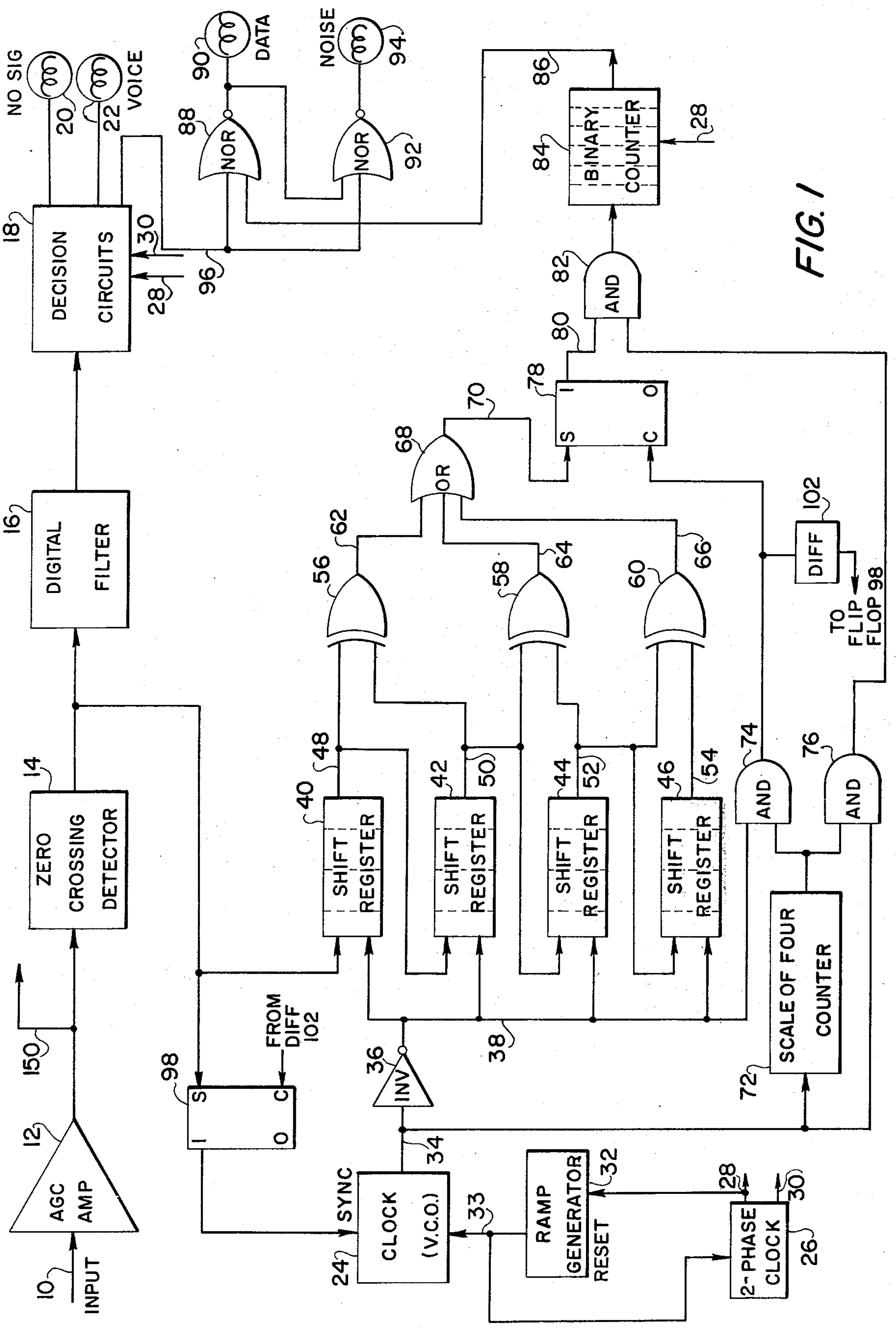
FIG. 1 illustrates the preferred embodiment of a system, shown in block diagram and logic form, for explaining the present invention.

Referring now to the drawings and specifically FIG. 1, it should be understood that the system shown therein can be connected into a communication line by an input line 10 so that noise or data signals can be received and analyzed. Where the system additionally distinguishes between voice signals and the absence of signals, line 10 also serves as the input for this expanded capability.

In accordance with the invention, there are means for providing a pulse train in response to excursions from a predetermined amplitude level in the signals applied to the communication line. As here embodied, this providing means further includes means for receiving the signals applied to such communication line and shaping them to provide a pulse train in which the edges of the pulses in the pulse train correspond to the zero crossings of the applied signals. Preferably, the latter means includes an amplifier 12 connected to the input line 10 so that the signals which are applied to the communication line are received and amplified. The output of amplifier 12 is connected to a shaping circuit, here identified as a zero crossing detector 14. The amplifier 12 preferably incorporates an automatic gain control circuit so that the system can accommodate input signals of a widely varying level, yet provide a substantially constant output level to the zero crossing detector. This AGC action, however, is somewhat slow acting so as not to elevate the level of low-level noise that might be present during brief interruptions of the applied signals, such as occurs during voice transmissions. The zero crossing detector 14 is preferably a squaring circuit which takes the output of amplifier 12 which is in AC form and generates a pulse train whose transitions or excursions form sharp edges which correspond to the zero crossings of the amplified signals.

The output of the zero crossing detector 14 is applied to the input of the digital filter 16. The digital filter can include, as an example, a pair of one-shots (not shown) to provide constant width pulses. One of these one-shots is actuated by pulse edges corresponding to positive-going excursions in the pulse train, and the other one-shot is actuated by edges corresponding to negative-going excursions in the pulse train. These two constant width pulses can then be applied to a coincidence gate with the output of such gate serving as the output of the digital filter 16 which is applied to the decision circuits 18. The operation of the digital filter 16 is such that when data is being received, a logic 0 is applied to decision circuits 18; when a no-signal condition exists at the input, the output of digital filter 16 is a logic 1; and in the presence of voice signals at input 10, the output of the digital filter is a logic 0 when signal bursts are present and a logic 1 in the pause between signal bursts. An example of this digital filter is shown in U.S. Pat. No. 3,767,860.

The logic in the decision circuits 18 processes the output of digital filter 16 with the aid of periodic clock inputs to provide an indication of a no-signal condition at lamp 20, the presence of voice signals at lamp 22, or the presence of either data or noise signals on line 96. As mentioned previously, the system disclosed in the aforesaid patent classified a noise input as data. While such classification may at times be acceptable, a further breakdown as to whether noise or data is the signal which is actually present can be helpful or desirable and in some situations may be a requirement. The capability to distinguish or discriminate between noise and modulated data is provided herein, and this capability can be combined with a system such as that of the aforedescribed type to identify all four signal conditions, or can be used by itself where it is only desired to know whether modulated data or noise is present. This latter capability will first be described and will then be followed by an expanded description of an embodiment of a system which distinguishes between all four signal conditions. Lastly the invention shown in FIG. 4 will be described.

Generation of Timing Pulses and Sampling Period

In accordance with the present invention, there are means for providing timing pulses at a varying rate. As embodied herein, such means comprise a variable frequency oscillator which generates timing pulses at a rate which varies between predetermined lower and upper limits. Preferably, the variable frequency oscillator is a voltage-controlled oscillator 24 which functions as a variable clock to provide the timing or clock pulses for the system which vary in rate or frequency. This clock 24 sweeps between the two predetermined frequency or rate limits for the purpose of finding repetitive patterns, as more fully described hereinafter, in the pulse train which is applied by the zero crossing detector 14.

Clock 24 is preferably swept in frequency for a predetermined duration defined as a sampling period, and is then returned to its initial rate to begin a new sweep. To this end there is provided means for setting the variable frequency oscillator at one of its predetermined limits at the start of each sampling period. As embodied herein, this setting means is a ramp voltage generator 32 whose output 33 is connected to the input of clock 24. The ramp voltage output is a sawtooth voltage which is reset at zero volts or some other minimum voltage level at the start of each sampling period.

A timer 26 is associated with the ramp generator 32 to establish sampling periods of predetermined duration. Timer 26 is preferably a two-phase clock which means that the clock has two outputs 28 and 30 each of which provides an output pulse alternately during each sampling period. The input for the two-phase clock 26 is obtained from the output of ramp generator 32. Output line 28 of this two-phase clock is connected as the reset input to ramp generator 32.

It has been found in the present system that a 4-second sampling period gives satisfactory results and is preferred, and the two-phase clock 26, accordingly, can be set to have a duration of 4 seconds. The sampling periods follow one another continuously. Each begins when ramp generator 32 is reset by the voltage pulse provided on output line 28 of the two-phase clock 26, which returns the ramp generator output to its minimum voltage level. Ramp generator 32 is self-running and its output voltage preferably increases in a linear manner. The two-phase clock 26 receives this ramp voltage and is preset to provide output pulses on lines 28 and 30 at predetermined intervals subsequent to the start of the sampling period in accordance with the voltage level attained by the ramp. For example, the first output pulse can be provided on line 30 halfway through the sampling period, or after 2 seconds have elapsed in the preferred 4-second example. The next output pulse appears at line 28 and is timed to occur at the end of the sampling period because its function is to reset ramp generator 32 to cause the existing sampling period to end and a new sampling period to begin. In the preferred example of a 4-second sampling period, the pulse on line 28 of course occurs after the passage of four seconds.

The ramp voltage of ramp generator 32 therefore has a duration equal in time to that of the sampling period and at the end of each sampling period is reset abruptly from its high voltage level to its minimum voltage level by clock 26 to begin a new ramp coincident with the start of the new sampling period. The two-phase clock 26 is of a known construction and as an example can include two voltage comparators each of which is set to a different predetermined reference voltage level to provide an output pulse when the ramp voltage reaches each such level. Preferably, this clock 26 is variable to permit the length of the sampling period to be changed as well as the point within the sampling period when the first clock output is obtained on line 30.

The output 33 of ramp generator 32 is connected to the input of clock 24 and is used to sweep the clock between its lower and upper rate limits during the preferred sampling period of 4 seconds. The clock is set at its lower rate limit at the start of the sampling period when the ramp generator 32 is reset and is driven or swept towards its upper rate limit by the increasing ramp voltage for the duration of the sampling period. This clock 24 is preferably swept slowly to assist the sampling apparatus in its detection of repetitive patterns, as more fully described hereinafter. As an example, the clock can be swept between 300 Hz and 3 KHz during each 4-second sampling period, and this frequency or rate range of one order of magnitude has been found in the preferred embodiment of FIG. 1 to provide a sufficiently slow sweep for the examination and detection of repetitive patterns. The output of clock 24 is a pulse waveform, having positive and negative half-waves of equal duration, which is applied to line 34. Both half cycles are preferably used in the system and an inverter 36 is employed to place the negative half-wave output in the proper logical state. The output of this inverter is applied to line 38.

Sampling and Comparing

In accordance with the invention, means are provided for sampling the pulse train at a varying rate and retaining temporarily the pulses which are sampled. This sampling means is connected to receive the pulse train which is applied in response to excursions in the signals in the communication line and is also connected to receive the timing pulses so that the pulse train is sampled at a varying rate in response to receipt of such timing pulses. As embodied herein, the sampling means comprises a plurality of serially arranged shift registers with the pulse train applied to the first shift register in the series. Preferably, there are four shift registers 40, 42, 44 and 46 with the outputs of shift registers 40, 42 and 44 forming the inputs of shift registers 42, 44 and 48, respectively. The pulse train output of the zero crossing detector 14 is applied to the input of shift register 40.

As embodied herein, the timing pulses are applied as clock inputs to each shift register. Preferably, clock output line 38 is connected into each shift register 40, 42, 44 and 46 to clock or advance the pulses or bits stored in these shift registers. In the present description, the digital state of the pulse train generated at the zero crossing detector 14 will be represented by logical 1's and 0's. For example, a logic 1 can represent a positive pulse in the train and a logic 0 can represent a negative pulse in the train. Thus, the digital states within the stages of the shift registers shown are a combination of logic 1's and 0's as determined by the digital state of the pulse train each time the input stage of shift register 40 is clocked by clock 24. If the pulse train is a logic 1 when shift register 40 is clocked, a logic 1 is loaded into the first stage of this shift register. Similarly, if the pulse train is in the 0 state when shift register 40 is clocked, a logic 0 is loaded into its first stage.

As each new pulse is loaded into shift register 40, the pulse previously loaded in the first stage is shifted one stage to the right, as viewed in FIG. 1. Whenever a pulse is clocked out of register 40, it is loaded into the first stage of register 42. Subsequent clockings also shift the pulses loaded in register 42 to the right. The same procedure applies with registers 44 and 46 except that when the pulse stored in the last stage of shift register 46 is shifted out of this register, it is not passed onto any additional stage but is dumped. The shift registers in effect perform a delay action on each pulse clocked into the input of shift register 40 since this pulse is not dumped out of shift register 46 until the passage of a number of full clock periods equal in number to the stages in the shift registers. Preferably, all shift registers 40, 42, 44 and 46 have the same number of stages, and for the present description it will be assumed that each shift register has four stages or a total of sixteen stages for all four shift registers shown.

In accordance with the invention, there are means provided for selectively comparing the pulses retained in the sampling means during sampling of the pulse train to determine whether there is an occurrence of predetermined digital states of the selected sampled pulses said pulse comparison occurring repetitively. The sampling means has a plurality of outputs on which the sampled pulses appear, and the comparing means selectively compares the sampled pulses appearing at the outputs of such sampling means. As embodied herein, the plurality of outputs are seen to include at least one output connected to each shift register and preferably include a single output 48, 50, 52, 54, connected to the last stage of shift registers 40, 42, 44 and 46, respectively. The comparing means includes at least one Exclusive-OR gate selectively connected to the outputs of the shift registers to determine whether there is a match of the digital states of the sampled pulses appearing at the ouputs. Preferably, there are a plurality of Exclusive-OR gates, here shown as being three in number and identified by numerals 56, 58 and 60.

Each Exclusive-OR gate has two inputs. Exclusive-OR gate 56 has its inputs connected to output lines 48 and 50 from shift registers 40 and 42, respectively. Exclusive-OR gate 58 has its inputs connected to output lines 50 and 52 from shift registers 42 and 44, respectively. Exclusive-OR gate 60 has its inputs connected to output lines 52 and 54 of shift registers 44 and 46, respectively. The output of these three Exclusive-OR gates are individually applied onto lines 62, 64 and 66.

While the detailed operation of the preferred embodiment of FIG. 1 will be described later, the operation of the Exclusive-OR gates will now be briefly described to show both broadly and specifically the comparison concept. As discussed previously, repetitive patterns appear when modulated data is present on the communication line in contrast to line noise and is believed to be caused by the distortion of the carrier signal by the modulation signal. However, neither the frequency of the carrier nor the frequency of the modulation signal is of paramount interest because the present invention relies upon the detection of the presence or absence of patterns as opposed to a frequency spectrum analysis. In this search for repetitive patterns, the input signal is converted to pulse form and then sampled. The sampled pulses are temporarily stored and are compared with each other to see if in the changing combination of logic 1's and 0's the same pattern emerges in all four registers. In FIG. 1, a match can be said to exist whenever the logical state of the four shift register output lines are the same, i.e., four 0's or four 1's. As now becomes readily apparent, if the same combination of pulses, i.e., the same pattern becomes stored in each shift register, then as these pulses are shifted or advanced by the clock pulses, a coincidence or match of logical states occurs repeatedly at the outputs of the shift registers until the pattern ceases to repeat. The match of these logical or digital states are readily detected by the operation of the Exclusive-OR gates.

It has been found convenient in determining whether or not there is a match to actually look for anti-coincidence or mismatch at the shift register outputs. Thus, if a mismatch is noted, there is an absence of a match; and, conversely, if there is an absence of a mismatch, a match of the digital states has to have occurred. The Exclusive-OR gate is especially suited to detect anti-coincidence or mismatches because whenever its inputs are not the same, its output is a logic 1. Whenever its inputs coincide, i.e., all 0's or all 1's, its output is a logic 0. Thus, by examining the output lines 62, 64, 66 of the three Exclusive-OR gates shown here, the presence or absence of a mismatch is readily determined. To aid in this examination, the output of each Exclusive-OR gate is applied to the input of an OR gate 68. The output of this OR gate is connected to line 70. During operation, as long as the outputs of the shift registers 40, 42, 44 and 46 all match, line 70 remains at logic 0. Should one or more of the Exclusive-OR gates detect a mismatch, however, line 70 rises to a 1. Thus, if logic 0's predominate at line 70, this will be indicative of the presence and detection of repetitive patterns in the input signal. Likewise, if logic 1's predominate at line 70, this will be indicative of the absence of repetitive patterns at the input.

There are means provided for establishing a plurality of comparison periods for the comparing means, the determination of whether there is a match of digital states occurring during each such comparison period. As embodied herein, this establishing means is responsive to the receipt of a predetermined number of timing pulses for establishing each such comparison period, and in this respect includes a counter 72 connected to line 34 in order to receive the timing or clock pulses applied by the voltage controlled oscillator 24. Preferably, counter 72 is a scale-of-four counter and the comparisonn comparison therefore, is equal to four clock pulse periods of clock 24. Counter 72 is of a known construction and can as an example consist of two flip-flops (not shown) arranged in tandem with the input from the clock 24 being applied to the first flip-flop of the pair and the output being taken from the second flip-flop. The output of counter 72 is connected as an enabling input to two AND gates 74 and 76.

The establishing means further embodies a bistable device 78 which is responsive to the output of counter 72 and also to the output of the comparing means applied on line 70. This bistable device is preferably a flip-flop designed to be switched from a first or Clear state to a second or Set state in response to the occurrence of a matched state of the selected sampled pulses during a comparison period. As shown, flip-flop 78 has its Set input connected to output line 70 of OR gate 68. In this manner, the flip-flop is in essence connected to the output of all three Exclusive-OR gates 56, 58 and 60 so that anytime one or more of these flip-flops determines that a mismatch has occurred, a logic 1 is passed through OR gate 68 to set flip-flop 78.

Flip-flop 78 is returned to its first state or cleared at the end of a comparison period in response to receipt of the predetermined number of timing pulses by counter 72. As shown, the Clear input of this flip-flop is connected to the output of counter 72 via AND gate 74. The second input to AND gate 74 is line 38 which applies the clock pulse from clock 24 after it has been inverted by inverter 36. AND gate 74 is enabled at the end of the comparison period when counter 72 reaches the count of four, and the clock pulse can now pass through this AND gate to clear flip-flop 78. Flip-flop 78 is thus cleared at the end of each comparison period so that it is placed in condition to register the occurrence of a mismatch of the digital states of the sampled pulses should such occur during the next comparison period. The output of flip-flop 78 is provided on line 80.

The second input of AND gate 76 is connected to line 34. The output of this AND gate is connected into one input of another AND gate 82. The second input of AND gate 82 is connected to line 80. AND gate 76 is enabled at the end of each comparison period so that a clock pulse arriving on line 34 can pass through this gate into AND gate 82. If flip-flop 78 is set to show that a mismatch has occurred during the comparison period which is just ending, coincidence occurs at the input of AND gate 82 and a logic 1 is passed onto the measuring means to be described hereinafter. If flip-flop 78 is in the clear state to show that no mismatches (thus only matches) have occured, then line 80 is at a logic 0 level and no coincidence can occur at AND gate 82.

As described above, each comparison period has a preferred duration of flour clock pulse periods. Thus, during each sampling period of 4 seconds, a large number of comparison periods occur; and during each such comparison period an examination of the contents of the shift registers 40, 42, 44 and 46 is made to determine whether there are mismatches in the pulses which have been sampled and temporarily stored. This operation will be described more fully hereinafter.

Match Counting and Output Circuits

In accordance with the invention, there are means provided for measuring the occurrences of said predetermined digital states of the selected sampled pulses as determined by the comparing means. As here embodied, the measuring means is a counter 84 which totals or counts the number of mismatches determined by the Exclusive-OR gates 56, 58 and 60. Preferably, this counter is a binary counter having an input connected to the output of AND gate 82 and thus responsive to the state of flip-flop 78. Counter 84 can advance only one count during each comparison period provided at least one mismatch has occurred. In such case, flip-flop 78 is set enabling AND gate 82; and at the end of the comparison period, a logic 1 is passed by AND gate 82 to the counts. During any comparison period, where a mismatch is not detected, flip-flop 78 is not set and coincidence cannot occur at AND gate 82 at the end of the comparison period.

Binary counter 84 is comprised of a plurality of stages with the output of the counter being taken from the last stage and applied on line 86. Line 86 is normally at a logic 0 indicative of data being present. If during a sampling period counter 84 counts a predetermined number of mismatches, then output line 90 goes from a logic 0 to a logic 1 to indicate that noise is present in the communication line.

Binary counter 84 has an additional input connected to the output line 28 of the two-phase clock 26. As was described earlier, clock 26 applies a pulse on line 28 at the end of each 4-second sampling period. At counter 84, this pulse serves two primary functions. One function is to reset all stages of the counter except the last stage at the end of each 4-second sampling period so that the counter is conditioned to undertake a new count of mismatched states during the next subsequent sampling period. The second function is to serve as a clock or toggle pulse to the last stage of the binary counter 84 so that its output, as it appears on line 86, is updated only at the end of each 4-second sampling period. Thus, even if the count in binary counter 84 should attain the predetermined count level prior to the end of the sampling period, the last stage of the counter becomes set but the output of the counter could not change until the 4-second period had elapsed and the update occurred.

The counter 84 must be of a sufficient length, that is contain a sufficient number of stages to handle the maximum mismatch count that can be expected to occur for any of the various types of modulated data that might be applied to the input. By so constructing the counter 84, it will not become filled when data is present, and a data input is not wrongly classified as noise.

In accordance with the invention, means are also provided which are responsive to the measuring means for providing an output indicative of the presence of data or noise in the communication line as determined by a predetermined magnitude of occurrences of predetermined digital states of said selected sample pulses. As embodied herein, the output of binary counter 84 is applied by line 86 to data and noise indicating circuits to indicate that either data or noise is present in the communication line. Preferably, line 86 is connected to a coincidence gate here represented by NOR gate 88. The output of this NOR gate is applied to a lamp 90 identified as the DATA lamp. The output of NOR gate 88 is also applied to the input of a second coincidence gate, again represented by a NOR gate 92. The output of this latter NOR gate is applied to lamp 94 here identified as the NOISE lamp. The second input of both gates 88 and 92 is connected to line 96 leading from the output of decision circuits 18. For the purposes of the present description where the system is assumed not to include the additional capability of detecting voice signals or no signal conditions and is directed solely to distinguishing between noise and data signals, line 96 is connected to a potential which applies a permanent logic 0 as an enabling signal to both gates 88 and 92.

Operation

In the description of operation of the embodiment shown in FIG. 1, it is assumed that either data or noise is present on the communication line and being applied to input 10. There is no need therefore to describe the action of digital filter 16 and decision circuits 18, and line 96 is at a potential that places a logic 0 at one input of NOR gates 88 and 92. It is also assumed that ramp generator 32 and two-phase clock 26 establish a 4-second sampling period, and during each sampling period the output of clock 24 sweeps from 300 Hz to 3 KHz. The output of clock 24 is a square wave in which each clock pulse period begins with a logic 1 half-cycle and ends with a logic 0 half-cycle. Thus, a logic 1 appears first on line 34 for a half-pulse period and then because of the presence of inverter 36 appears on line 38 during the second half of the clock pulse period.

Generally, the range or band of frequencies which can appear at the input line 10 is known, and it is assumed that any data which appears will be within the frequency range of 300 through 4,000 Hz. The input signals which are received are amplified in AGC amplifier 12 and then shaped in zero-crossing detector 14 to provide a continuous pulse train. The pulse train is applied to the input of shift register 40.

Clock 24 begins its sweep and applies clock pulses on line 38 to the four shift registers 40, 42, 44 and 46. The digital or logical state of the pulse train is now continuously sampled by the clock pulses. Each sampled pulse is first applied to shift register 40, and then advanced or shifted through shift register 40 and the remaining three registers in response to continued application of clock pulses. The four shift registers quickly become loaded with sampled pulses, and as each new pulse is clocked into register 40, the oldest is dumped out of register 46.

As described previously, each 4-second sampling period is divided into a plurality of comparison periods and each comparison period is preferably four clock pulse periods in length, this having been predetermined by the scale-of-four counter 72. The three Exclusive-OR gates 56, 58 and 60 compare the four outputs of the shift registers following each clock pulse, or 4 times in all during each comparison period, to see whether there is a mismatch of the sampled pulses at any pair of outputs. In this way, the entire contents of the four shift registers are compared during each comparison period. Should any of the register outputs 48, 50, 52 and 54 not be at the same logical state as the other outputs during any of the four comparisons, then from one to three mismatches can occur. In such case, at least one logic 1 signal is applied to OR gate 68 and flip-flop 78 becomes set.

The output of counter 72 is normally a logic 0, and both AND gates 74 and 76 are disabled. The fourth clock pulse out of clock 24 during a comparison period advances counter 72 to the fourth count and its output goes to logic 1; enabling the two AND gates 74 and 76. The clock pulse at this time is still present on line 34 and it passes through enabled gate 76 to AND gate 82. If flip-flop 78 has been set during the comparison period in response to a mismatch having been detected by any of the three Exclusive-OR gates, the arrival of the pulse from AND gate 76 finds AND gate 82 enabled. A logic 1 appears at the output of this AND gate and is passed to binary counter 84 to be counted.

The second half of the fourth clock pulse in the comparison period is a logic 0 which is inverted at 36 and applied by line 38 to the enabled AND gate 74. A logic 1 is passed out of this AND gate to clear flip-flop 78. The comparison period ends and a logic 0 is now applied by this flip-flop to AND gate 82.

During each comparison period the pulse train applied at the input of shift register 40 is sampled 4 times by the clock pulses, and the sampled pulses which have been previously stored in the shift registers are advanced four stages. For the four-stage registers used in FIG. 1, this means that register 40 is loaded with new samples and the remaining three registers acquire the contents of the register which precedes them during the span of a comparison period. Because the clock 24 is swept slowly, e.g., between 300 Hz and 3 KHz in 4 seconds, the system effectively samples the pulse train at regular intervals during each comparison period.

If data is present, there will be certain rates attained by clock 24 in its sweep where the same pattern of logic 1's and 0's is clocked in the same sequence into each of the four shift registers. Whenever this occurs, then for one or more comparison periods the contents of the four shift registers 40, 42, 44 and 46 are identical. During each such comparison period therefore, the four outputs 48, 50, 52 and 54 continually match (all 1's or all 0's) as the sampled pulses are shifted or advanced through the shift registers. Because no mismatches are detected by the Exclusive-OR gates 56, 58 or 60, flip-flop 78 does not become set. At the end of each such comparison period, the pulse applied by AND gate 76 does not find AND gate 82 enabled and the output of this latter gate remains at logic 0. The binary counter 84 accordingly has no mismatch to count.

At the end of the 4-second sampling period, a pulse is generated by the two-phase clock 26 and applied by line 28 to binary counter 84. The binary counter has not attained a full count, and a logic 0 appears on output line 86. Coincidence occurs at NOR gate 88 and a logic 1 is applied to lamp 90 to illuminate this lamp and give an indication of the presence of data. This logic 1 output is also applied by NOR gate 88 to one input of NOR gate 92 and its output is held at logic 0. Lamp 94 remains dark. The pulse on line 28 is also applied to ramp generator 32 to reset the ramp voltage. The ramp generator in turn restarts the two-phase clock 26 and resets the variable clock 24 at its lower frequency limit of 300 Hz. A new sampling period begins. As long as modulated data continues to be applied to the input 10, the system continues to display the presence of DATA at lamp 90 because an insufficient number of mismatches occurs during each sampling period to permit binary counter 84 to reach a count indicative of noise.

While certain rates attained by clock 24 in its 4-second sweep cause identical pulse sequences to be loaded into the four shift registers by the sampling of the input pulse train, there will be clock sampling rates where no repeat patterns are found and coincidence at the four shift register outputs is infrequent. The Exclusive-OR gates then detect one or more mismatches during the comparison periods. However, flip-flop 78 can only be set once during any comparison period of four clock pulses regardless of the number of times that a mismatch occurs at the shift register outputs, and only one mismatch is counted by binary counter 84 for any one single comparison period.

Assume now that noise is present at input 10. It is assumed that the level of this noise is above the release point of the AGC circuit in amplifier 12, and thus the AGC acts upon the noise to raise it to a constant output level. The amplified noise is then applied to zero-crossing detector 14 and a pulse train output occurs. This pulse train is applied to the input of shift register 40 where it is sampled by the clock pulses from variable clock 24 during each four-second sampling period.

The random character of the noise makes the probability quite low that repetitive patterns will be observed as clock 24 sweeps through its frequency band during the sampling period. If such repetitive patterns do occur, they will do so infrequently and generally in a random manner. The outputs of the shift registers 40, 42, 44 and 46 do not match except at random times during the sampling period. Thus, a large number of noncoincident inputs appear at the Exclusive-OR gates 56, 58 and 60 during each sampling period. During each comparison period, therefore, there is a large possibility that at least one mismatch will occur at the shift-register outputs. When such does occur, it is detected by one of the Exclusive-OR gates, and flip-flop 78 is set. A count is then applied to binary counter 84 at the end of the comparison period.

A sufficient number of mismatches are counted during the total sampling period to cause binary counter 84 to attain its predetermined count. The last stage (not shown) in counter 84 is set to hold this count. When a pulse is applied by the two-phase clock 26 on line 28 at the end of the sampling period, the output stage of the binary counter is clocked to cause line 86 to go to a logic 1. The output of NOR gate 88 goes to logic 0, and NOR gate 92 now see two logic 0 inputs. Its output goes to logic 1 causing lamp 94 to become illuminated and indicate that NOISE is present in the communication line. At the same time lamp 90 becomes dark.

Sychronizing Circuit

It has been found in the operation of the aforedescribed system that repetitive pattern detection can be enhanced if means are provided for synchronizing the generation of the timing pulses with the pulses generated by the zero-crossing detector 14. As embodied herein, the synchronizing means includes a second bistable device, here shown as flip-flop 98 in FIG. 1, having a pair of inputs and an output which is connected to the variable frequency oscillator or clock 24.

Preferably, the first or set input of flip-flop 98 is connected to receive the pulses in the applied pulse train. Whenever this flip-flop has been cleared, it is switched to the set state by the arrival of a pulse edge represented by the transition from a logic 0 to a logic 1 level. The Clear input is connected to the output of differentiator 102 which is in turn connected to the output of AND gate 74. Flip-flop 98 is cleared at the end of each comparison period when the scale-of-four counter 72 attains its fourth count. The clock pulse which passes through enabled gate 74 at the end of the comparison period is differentiated at differentiator 102, and a spike is applied to the Clear input of flip-flop 98. In operation, therefore, the synchronizing signal is removed from clock 24 and the generation of clock pulses temporarily halted at the end of each comparison period, but a new synchronizing signal is applied to restart clock pulse generation by the next logic 0 to logic 1 transition in the pulse train applied by the zero-crossing detector 14.

If the clock rate 24 or a multiple thereof is not quite equal to the pulse rate of the pulse train, the phase-difference between the two rates can cause non-repetitive patterns to be sampled and stored in the shift register even though repetitive patterns may be present in the pulse train. The synchronizing means, therefore, stops the clock at the end of a comparison period and permits it to restart only upon the arrival of a pulse transition in the pulse train out of zero-crossing detector 14. In this way, each comparison period begins with the first clock pulse and the first pulse train pulse arriving at approximately the same time at the input of shift detector 40. The result is that there is a higher probability of detecting a repetitive pattern because the two pulse rates will remain more nearly in phase during the brief comparison period.

Voltage-controlled oscillators with synchronizing leads are well known and what generally occurs and preferably occurs here is that the oscillator is clamped in the absence of the synchronizing signal to prevent further oscillations from occuring. The synchronizing input serves to unclamp the oscillator so that it can again oscillate and emit output signals. The use of the synchronizing means in the present invention which momentarily stops the oscillator or clock 24 at the end of each comparison period does not actually prevent the clock from attaining substantially its full sweep during the 4-second sampling period. This is because ramp generator 32 continues to run even when clock 24 is briefly stopped at the end of each comparison period. When clock 24 renews operation in response to the applied sync signal from flip-flop 98, the clock pulses will be generated at a slightly increased rate. The effect upon the detection of repetitive digital patterns is at most minimal, and the output of clock 24 can in effect still be considered a continuous sweep between the preset upper and lower rate limits.

Tapped Delay Line

Figure 2:
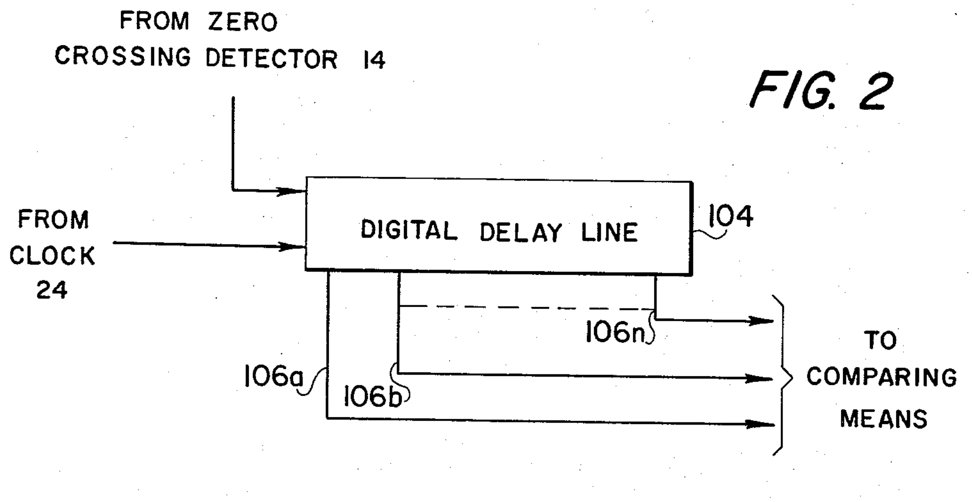
FIG. 2 is an alternative construction of the sampling means described in FIG. 1.

An alternative construction of the sampling means is shown in FIG. 2. As embodied herein, a digital delay line 104 is presented in block form. As in the case of the shift register chain shown in FIG. 1, the pulse train to be sampled is applied by the zero-crossing detector 14 to one input of delay line 104, and the clock or timing pulses provided by clock 24 are applied to the second input of this delay line. Each pulse in the train which is sampled by clock 24 is inserted at the beginning of the delay line as a logic 0 or logic 1 bit or pulse and these bits progress along the line in response to subsequent loadings of the sampled pulses.

A plurality of outputs 106*a*, 106*b* . . . 106*n* are preferably spaced evenly along the delay line 104 so that these plurality of outputs can be compared in the search for repetitive patterns in the applied pulse train. These outputs are connected into a suitable type of comparing means. As an example, such comparing means can comprise the Exclusive-OR gates described in the embodiment of FIG. 1. Another example of a comparison means suitable for detecting matches or mismatches of the signals on the output lines 106 is an adder which could total the pulses following each clock pulse and determine a match or mismatch based upon the sum obtained.

Decision Circuits 18 and Expanded System Operation

As mentioned previously, the system for distinguishing between noise and data signals can be expanded to additionally distinguish between voice signals and the absence of signals at input line 10 and suitable additional circuitry can be employed for that purpose. An example of a specific system which is adaptable for this purpose is that disclosed in the aforementioned U.S. Pat. No. 3,767,860. The operation of such system was described briefly earlier in this specification. However, for a clearer understanding of just how noise, data, voice and a no-signal condition can be discriminated each from the others, a description of the preferred embodiment of the decision circuits 18 in combination with FIG. 1 will now be undertaken.

Figure 3:
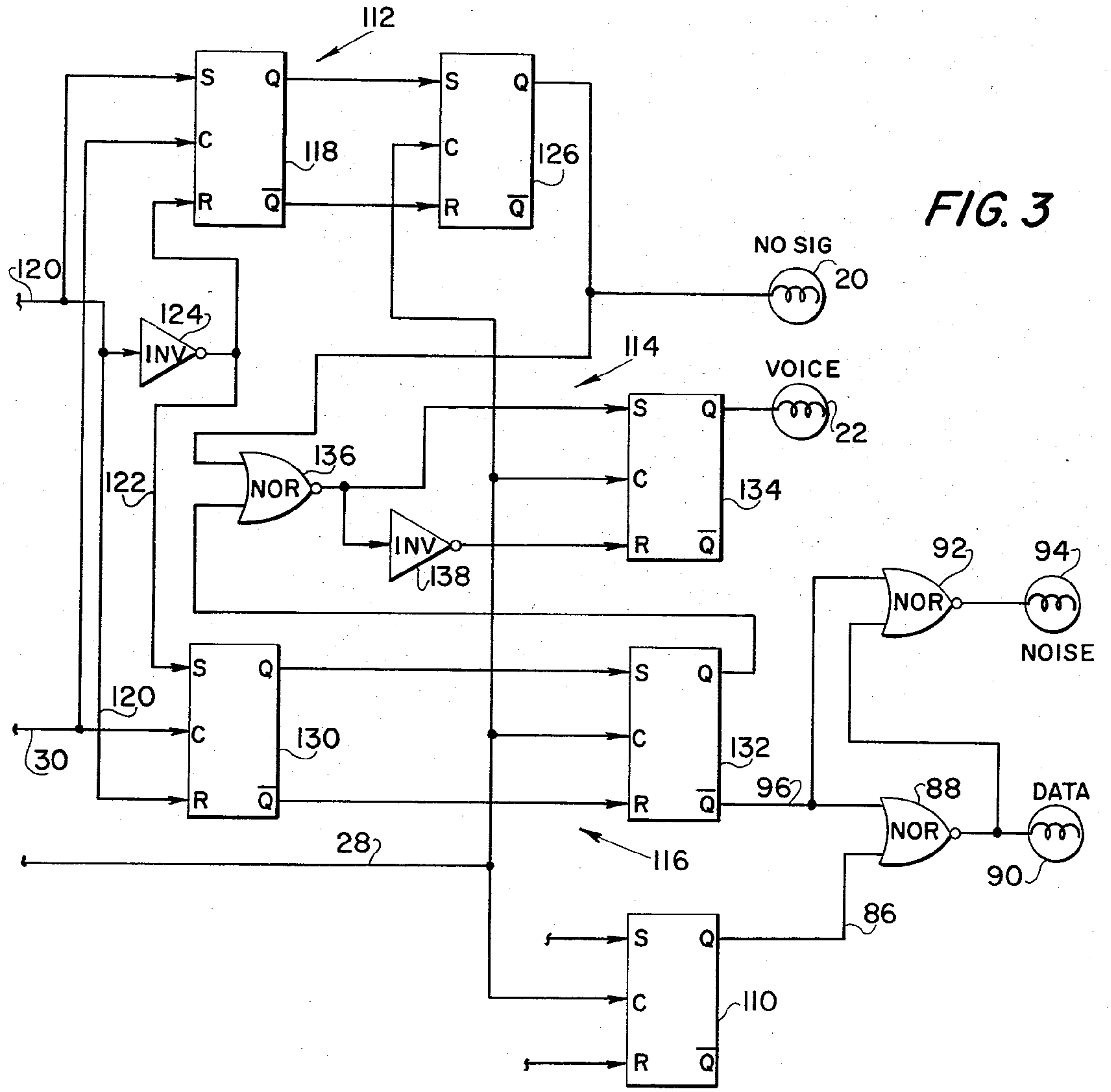
FIG. 3 is a preferred embodiment in block diagram and logic form of the decision circuits of FIG. 1.

The decision circuits are shown in block diagram and logic form in FIG. 3. Included as part of the decision circuits is the output or last stage 110 of binary counter 84 described in FIG. 1. This output stage, which is preferably a flip-flop as shown, is updated at the end of each four-second sampling period, as are the output stages of the decision circuits, and a better understanding of system operation can be obtained if this counter output stage is included as part of the decision circuitry discussion.

As embodied herein, the decision circuits are connected as three channels, indicated generally by arrows 112, 114 and 116. The input to these three channels are applied by digital filter 16 on line 120 and by the two-phase clock on lines 28 and 30. Depending upon the type of signal, or absence of signal, presented at the input line 10, one and only one of these circuits will be actuated. The signal which is derived at each channel can be used to provide either control or indication functions, by way of example. Preferably, each output is used to drive an output lamp.

Channels 112 and 116 both include a pair of JK flip-flops connected in tandem to function as a shift register. As may be seen from the figure, channel 112 includes flip-flop 118 whose SET input is connected to line 120 and whose RESET input in connected to line 122. An inverter 124 is connected between lines 120 and 122. The clock input of flip-flop 118 is connected to line 30. The Q output of flip-flop 118 is connected to the SET input of flip-flop 126. The RESET input of flip-flop 126 is connected to the $\overline{Q}$ output of flip-flop 118, and its clock input is connected to line 28. The Q output of flip-flop 126 is connected to lamp 20, although an output transistor can be interposed in the output line if desired.

Channel 116 is of similar construction; however, the SET side of the input flip-flop 130 is connected to line 122 while the RESET input is connected to line 120. The clock input is connected to line 30. The Q output of flip-flop 130 is connected to the SET input of flip-flop 132 and the $\overline{Q}$ output of flip-flop 130 is connected to the RESET input of flip-flop 132. The clock input of flip-flop 132 is connected to line 28. The $\overline{Q}$ output of flip-flop 132 is connected to output line 96 of the decision circuits 18.

Channel 114 differs in construction from channels 112 and 116 and preferably contains a single flip-flop 134 whose clock input is connected to line 28. The SET input of flip-flop 72 is connected to the output of a NOR gate 136. The two inputs to NOR gate 136 are connected to the Q output of flip-flop 126 in channel 112 and the Q output of flip-flop 132 in channel 116. The output of NOR gate 136 is also connected to the input of inverter 138 whose output is in turn connected to the RESET input of flip-flop 134. The Q output of flip-flop 134 is connected to lamp 22, although an output transistor can be interposed in the output line if desired.

In operation, the range or band of frequencies which can appear at the input line 10 (FIG. 1) is known, an example being the range of 300 Hz – 3KHz. Assume for the purpose of the description of the operation of the invention that a telephone line is being monitored at input line 10 (in FIG. 1). In such case, all of the applied signals will be tones. As explained in the aforementioned U.S. Pat. No. 3,767,860, whenever data is applied on the input line 10, a logic 0 is applied on line 120 at the input to the decision circuits 18. Because of the continuous character of noise, its application at input 10 is interpreted by the digital filter 16 as data and a logic 0 is also applied to the input of the decision circuits by line 120.

When no signal is being applied at input 10 in FIG. 1, a logic 1 is applied by the digital filter 16 on line 120. During the presence of voice signals at input 10, the output applied by the digital filter 16 on line 120 is a logic 0 when signal bursts are present, but between signal bursts, line 120 becomes a logic 1.

For purposes of convenience, channel 112 has been designated the "NO-SIGNAL" channel, and channel 114 has been designed the "VOICE" channel.

Assuming that a no-signal condition is present at the input 10 (FIG. 1), a logic 1 is applied on line 120 to set the flip-flop 118 in channel 112. At clock 26, the first output pulse is applied over line 30 to the clock input of flip-flop 118 to cause its Q output to rise to the logic 1 state. This logic 1 is thus shifted or applied to the SET input of flip-flop 126. The subsequent clock output, which arrives at the end of the 4-second sampling period, is applied on line 28 and thus to the clock input of flip-flop 126. The Q output of this flip-flop rises to a logic 1 and illuminates lamp 20. In this manner an indication of a no-signal condition is made.

If the no-signal condition terminates prior to the actuation of lamp 20, the signal on input line 120 becomes a logic 0. This is inverted at inverter 124 to a logic 1 and applied by line 122 to the RESET input of flip-flop 118. This RESET is self-clocking and the $\overline{Q}$ output of flip-flop 118 becomes a logic 1 and the Q output becomes a logic 0. Thus, flip-flop 126 cannot be set by the subsequent clock pulse applied by line 28 to its clock input, and lamp 20 does not become lit. In a similar manner, channel 112 is reset when the no-signal condition ends. Flip-flop 118 becomes reset as described above, and then the next clock pulse on line 28 resets flip-flop 126 because a logic 1 is now being applied to its RESET input by the $\overline{Q}$ output of flip-flop 118. Lamp 20 becomes dark.

Channel 116 operates in much the same way as the NO-SIGNAL channel 112, except that the inverter 124 changes the logic 0 appearing on line 120 when DATA or NOISE is present, to a logic 1 which is applied to the SET input of flip-flop 130. If the input signals persist for both phases of clock 26 during the 4-second sampling period, the logic 1 signal is first transferred from flip-flop 130 to flip-flop 132 by the clock pulse applied on line 30; and then applied at the Q output of this latter flip-flop by the clock pulse applied on line 28. At the $\overline{Q}$ output, a logic 0 is applied on line 96 to indicate the presence of DATA or NOISE signals at the input of the system.

Should the DATA or NOISE input signals end prior to the time a logic 0 is applied to line 96, channel 116 is cleared in the same manner as channel 112 except that the self-clocking reset of flip-flop 130 is actuated by a logic 1 on line 120. Similarly, the reset of channel 116 is initiated when the DATA/NOISE input ends by a logic 1 signal resetting flip-flop 130. A logic 0 is clocked to flip-flop 132 and this is followed by a clock pulse on line 28 resetting flip-flop 143 at the end of a sampling period.

When VOICE signals are applied to input 10 in FIG. 1, the level of line 120 is at logic 0 when a burst of VOICE is present and at logic 1 in the pause between bursts. It has been assumed that uninterrupted speech or an uninterrupted pause will not persist for more than 2 seconds. Thus, neither logic signal persists long enough without interruption to permit clock 26 (FIG. 1) to generate both an output on line 30 followed by an output on line 28. Neither channel 112 nor channel 116 has sufficient time to become completely activated. The Q outputs of both flip-flops 126 and 132 are or become a logic 0. Nor gate 136 in channel 114 receives both of these signals and provides a logic 1 output to the SET input of flip-flop 134. When the sampling period then in progress ends, a spike from clock 26 arrives on line 28 to set flip-flop 134. The Q output of this flip-flop applies a logic 1 to lamp 22 to turn it on and indicate the presence of VOICE signals on the line being monitored at input 10.

When the VOICE signals end, either a DATA/NOISE signal or a NO-SIGNAL condition occurs. When the Q output of either flip-flop 126 or flip-flop 132 becomes a logic 1 according to the operation described previously, NOR gate 136 assumes a logic 0 condition which is inverted by inverter 138 to reset flip-flop 72 by its self-clocking action. Lamp 22 goes dark.

With additional reference to the complete system shown in FIG. 1, whenever line 96 is clocked to a logic 0 by operation of decision circuits 18, this is indicative of the presence of either noise or modulated data at the input 10. The output obtained at binary counter 84 must therefore be considered to resolve the question of which signal is actually present.

The last stage 110 of counter 84 is shown in FIG. 3 and as can be seen it is preferably connected in the same manner as the output flip-flops of channels 112, 114 and 116. Flip-flop 110 is thus clocked by the pulse applied by two-phase clock 26 on line 28 at the end of each 4-second sampling period. If counter 84 fails to reach the predetermined noise (mismatch) count by the end of a sampling period, a logic 1 is applied to the Reset input of flip-flop 110, and a logic 0 is clocked onto line 86 by the clock pulse on line 28. Similarly, if counter 84 does reach its predetermined mismatch count prior to the end of the 4-second sampling period, a logic 1 is applied to the Set input of flip-flop 110 and this level is clocked onto line 86 at the end of the sampling period.

Whenever line 96 is clocked to a logic 0 at the end of a sampling period, the clocking of a logic 0 onto line 86 further classifies the input as data. NOR gate 88 provides a logic 1 output and lamp 90 becomes illuminated to give a positive indication of the presence of data at the input. On the other hand, if line 86 is clocked to a logic 1 at the end of the sampling period, the input is now clearly identified as noise. An indication of this is made at lamp 94 which becomes illuminated by the logic 1 applied by NOR gate 92.

It should be noted that in the expanded system where all four input conditions can be distinguished, the signal applied on line 86 has no significance unless line 96 is at a logic 0. In other words, if the decision circuits 18 determine that voice or a no-signal condition exists, it is immaterial to the decision-making process what output is provided on line 86 by that part of the system which distinguishes between noise and data. Electronically, this can be appreciated by the fact that a logic 1 signal on line 96 holds the outputs of NOR gates 88 and 92 at a logic 0. Neither lamp 90 nor 94 can become illuminated, regardless of the signal applied on line 86, as long as the logic 1 persists on line 96.

The advantage of having the output flip-flop in each channel and flip-flop 110 of counter 84 all clocked by the same signal is that the entire system output and display is updated simultaneously. In this manner, the system keeps one lamp illuminated continuously until the signal at the input changes from one of the four types to another type and is processed by the system. At such time, the system functions in the manner as has been described to detect this change in the type of input signal and indicate the change at lamps 20, 22, 90 and 94. The simultaneous clocking of the four output flip-flops causes the lamp which was lit to go dark and at the same time illuminates the lamp corresponding to the type of signal now appearing at the input.

The expression "modulated data" as used herein encompasses amplitude, frequency and phase modulation, and the present invention is adaptable to detecting any of these types or combinations of these types of modulated data. Examples of the particular modulation schemes which can be employed include such things as four-phase modulation, eight-phase modulation, vestigial sideband modulation, frequency-shift-keying (FSK), and channelized FSK or frequency-division-multiplex (FDM). The particular scheme used is usually dependent upon a modem which interfaces the digital equipment and the analog communications line. Where such modems are employed, the systems of the present invention are designed to be coupled to the communication line on the analog or AC side of the modem, that is, after modulation and before demodulation has occurred.

FSK Detector

It has been found that when modulated data is received in the form of frequency-division-multiplex (FDM) or channelized FSK, it is possible for the system shown in FIG. 1 improperly to classify this data as noise. The likelihood of this occurring is more pronounced when the FSK data is present in many channels simultaneously within the FDM band. An explanation for this is that in the time domain, channelized FSK data begins to resemble noise as more channels are added because the zero crossings become more random. If the pattern detector in FIG. 1 fails to find the predetermined number of matched patterns during the 4-second sweep of clock 24, the binary counter 84 will provide a logic 1 output on line 86, falsely representing that noise is being applied to the input. An erroneous indication is thus made when lamp 94 is lit.

Figure 4:
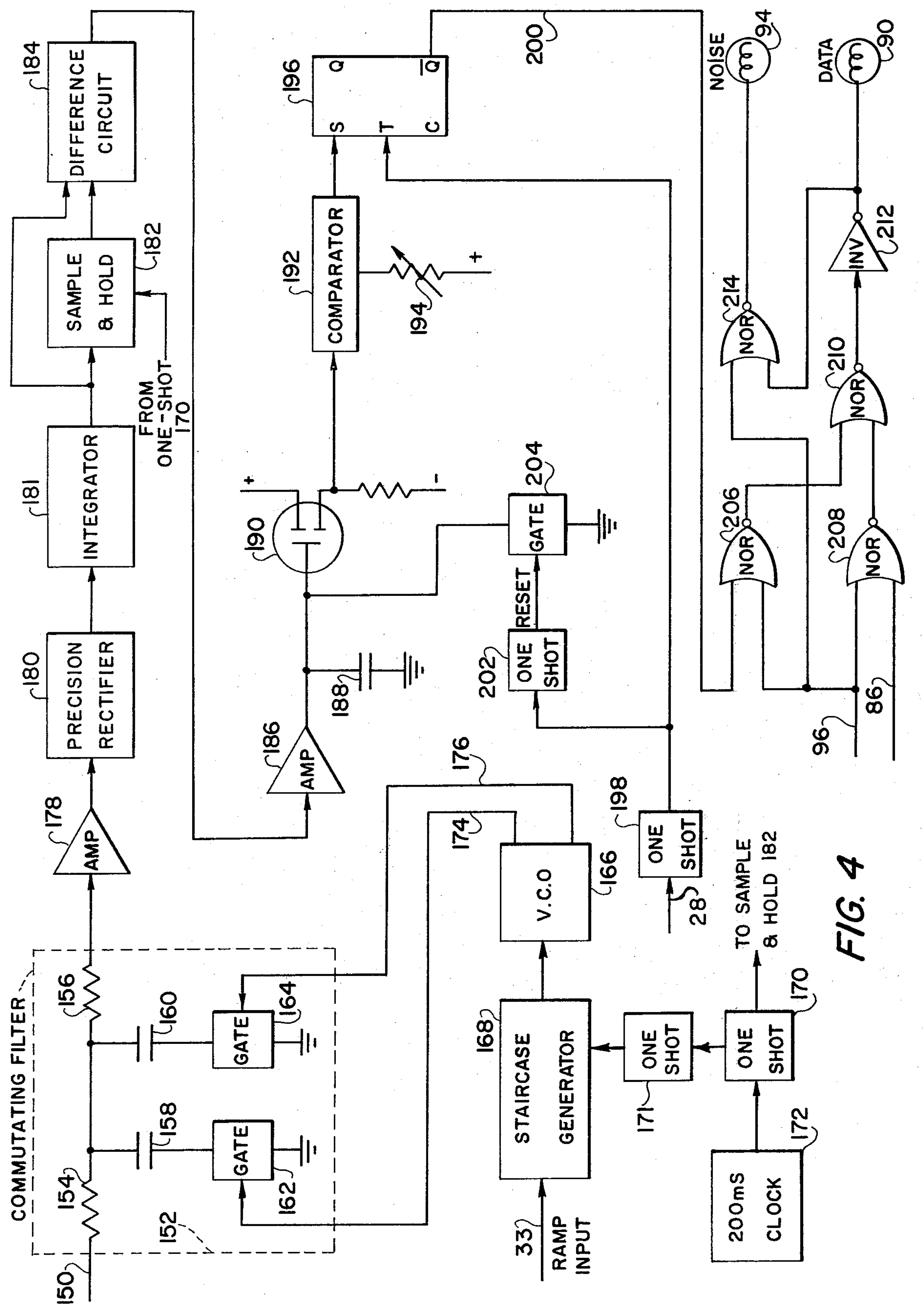
FIG. 4 is a preferred embodiment of the invention in block diagram and logic form which can be combined with the type of system shown in FIG. 1 in detecting multi-channel FSK data.

With reference now to FIG. 4, there is shown the preferred embodiment of the system of the present invention for superseding the decision made when channelized FSK data is being received. Preferably, this system is combined with the system of FIG. 1; however, in contrast to the system of FIG. 1 where the input signal is processed in the time domain on a real-time basis, the system of FIG. 4 operates in the frequency domain. The input signal is therefore applied to the system of FIG. 4 by line 150 prior to the conversion to pulse form by zero-crossing detector 14.

Normally, many FSK modulated signals may be transmitted on a single line if they are suitably distributed within the band allocated for those signals. For example, if the allocated FDM band lies between 300 Hz and 3 KHz, a number of narrow data channels can be spaced across this band with each narrow channel separated from its adjacent channels by a guard band. Each narrow FSK channel includes two carrier frequencies for the FSK modulation and their side bands. The energy spectrum of the total FDM band is a series of peaks, each of which is centered at the midpoint frequency of each of the narrow channels.

In accordance with the invention, means are provided responsive to the signals in the communication line for detecting the energy contained in such signals at a plurality of spaced frequencies in the frequency band of the data signals. As embodied in FIG. 4, the aforesaid energy detecting means includes further means for passing the energy contained in the input signals at a plurality of spaced frequencies in the frequency band of the data signals. Preferably, this latter means includes a variable bandpass filter 152 which is constructed to pass signals at a plurality of narrow, spaced bands or frequencies to the remainder of the system. The particular filter shown in FIG. 4 is known as a commutating filter which is operated in discrete steps across the preset data band. This filter includes resistors 154 and 156 in the series arm and capacitors 158 and 160 in the shunt arms. Each capacitor is in series with a gate 162 and 164, respectively. When either of these gates is on, its associated capacitor is connected to ground by a very low impedance. When either of these gates is off, it imposes a very high impedance in series with the capacitor. Preferably, the commutating filter 152 steps completely across the FDM data band every 4 seconds in approximately 20 steps equally spaced in frequency. Stepping is preferred instead of a continuous sweep because this gives the filter time to stabilize or settle following each step and thus efficiently perform its bandpass function at each of the approximately twenty narrow bands selected by the filter within the total FDM band.

The means for varying or stepping filter 152 includes a voltage-controlled oscillator 166 which is driven by a staircase generator 168. The input voltage for the staircase generator is applied by line 33 from the output of ramp generator 32 (FIG. 1). Each step of the staircase generator 168 is controlled by a one-shot 171 which is clocked or toggled periodically by a 200 ms. clock 172. This 200 ms. clock divides each sampling period into approximately 20 equal segments.

Each 200 ms. pulse out of clock 172 toggles one-shot 170. This one-shot briefly assumes its semi-stable state. Upon its return to its stable state, the one-shot 170 toggles one-shot 171. The output of one-shot 171 is applied to the staircase generator for a brief period of time equal to the duration of the semi-stable state of this one-shot, and during each such brief period of time the voltage of the ramp applied on line 33 is passed into the staircase generator 168 and permits it to step up to a new level. Each step attained by the staircase generator causes the voltage-controlled oscillator 166 to step to a new output frequency.

Oscillator 166 operates in the selected band of the FDM data, and in the present example steps between 300 Hz and 3KHz in 20 steps during the 4-second sampling period. The outputs of oscillator 166 are pulses which alternately appear on the two output lines 174 and 176 of the oscillator. Each time a pulse appears on line 174, gate 162 is turned on to connect capacitor 158 to essentially ground potential. Likewise, when the output pulse appears on line 176, it turns on gate 164 and connects capacitor 160 to essentially ground potential. Thus, in operation each of these capacitors is alternately connected to ground by the output of the voltage-controlled oscillator 166.

The center frequency of each passband of the commutating filter 152 is established by the frequency of oscillator 166. The Q of the filter is determined by the filter componenets and is preferably a low Q in which the skirts of the passbands overlap. This construction aids in fast stabilization of filter 152 following each step and also prevents excessively sharp signal spikes from passing through the filter and saturating the amplifiers and other circuits, should the center frequency of the filter land upon the center of an FSK channel while stepping across the FDM band.

In the present preferred embodiment, it is not necessary that the center frequency of each narrow passband be selected so that it is coincident with the center frequency of each narrow data channel in the FDM band. In fact, the center frequencies of the passbands change from one sampling period to the next because the 200 ms. clock 172 is not synchronized to begin with the start of each sampling period. The filter 152 is preferably designed to pass during its sweep sufficient energy to cause a positive identification of FSK modulated data, when such is present at the input 150, without the necessity of the filter passband having to coincide exactly with the data channels in the FDM band.

The signals passed by the commutating filter 152 at each passband are amplified by an amplifier 178 and AC-coupled to a precision rectifier 180. Precision rectifier 180 preferably gives full-wave rectification to the filter output with the resultant being a DC output proportional to the amplitude of the energy passed by the filter 152. The output of the precision rectifier 180 is integrated by integrator 181 to obtain a system proportional to the rectifier output. This integrator 181 acts essentially as a filter to smooth out spikes or other high-level transients which might pass filter 152 and rectifier 180. The output of integrator 181 can best be visualized Logic the outline or envelope of the rectifier output, with each level corresponding to the occurrence of a filter step.

This output of the integrator 181 is connected to the input of a sample-and-hold circuit 182 which samples each level of the energy passed by filter 152. As here embodied, this sample-and-hold circuit samples each of the twenty levels in the integrator output which occur during each 4-second sampling period and holds each signal level until updated by the next level. The taking of the samples by circuit 182 is here made responsive to the operation of the 200 ms. clock 172. Each clock pulse generated by this clock toggles one-shot 170 to its semi-stable state which actuates the sample-and-hold circuit 182. This occurs just prior to the time the staircase generator 168 is advanced to a new level by one-shot 171. Thus, circuit 182 is updated just before the commutating filter 152 is stepped to its next position, and circuit 182 stores the filter output, after rectification and integration, at the then-existing filter output level. When filter 152 is then advanced to its next position by voltage-controlled oscillator 166, the value stored in sample-and-hold circuit 182 does not change because the one-shot 170 has already returned to its stable state.

As embodied herein, the output of integrator 181 and sample-and-hold circuit 182 are both applied to a difference circuit 184 which selectively compares the energy passed by the passing means at the plurality of spaced frequencies in the frequency band of the data signals. Preferably, each new energy level of filter 152, as represented at integrator 181, is compared in difference circuit 184 with its next preceding output level stored in sample-and-hold circuit 182. The difference between these two signals is applied to the input of amplifier 186. The difference signal is preferably always obtained with the same sign, i.e., absolute value, regardless of whether the output signal is greater at integrator 181 or at sample-and-hold circuit 182. This can be readily achieved, for example, by a full-wave rectifier (not shown) included as part of difference circuit 184 or amplifier 186.

The output of amplifier 186 is applied to means for accumulating a voltage in response to the difference in energy level of adjacent filter outputs. Preferably, this voltage accumulating means includes a storage capacitor 188 which attains a peak voltage during each 4-second sampling period by integrating the output of the difference circuit during the 20 steps of filter 152. Connected to capacitor 188 is a field-effect transistor 190 constructed as a source follower. The high input impedance of this transistor deters leakage from capacitor 188 so that this capacitor holds its charge until reset.

In accordance with the invention, there are means provided for comparing the level of the detected energy with a predetermined energy level. As embodied herein, said comparing means includes a comparator 192 having two inputs. The voltage level being accumulated on capacitor 188 is preferably applied via source follower 190 to one input of this comparator. The other input of comparator 192 is made variable at 194 to permit its being preset to a desired reference voltage level. The output of comparator 192 is connected to the Set input of flip-flop 196.

It has been determined that where FSK data is present in six or seven or more channels, the embodiment of FIG. 4 is most useful in superseding any erroneous determination of noise presence that might be made in the pattern detector portion of FIG. 1. Therefore, for the purpose of describing the operation of FIG. 4, assume that such multichannel FSK data is applied at the input 10 and appears after amplification on line 150. As each burst of energy is passed by commutating filter 152 during the course of its stepped sweep, it is rectified, integrated, and applied to one input of difference circuit 184. The signal which is stored in sample-and-hold circuit 182 and applied to the second input of difference circuit 184 is representative of the energy level provided by filter 152 during its preceding step because circuit 182 is not updated by integrator 181 until just prior to the end of the then-existing step. Thus, difference circuit 184 always has two energy levels being applied at its input to operate upon, such levels being representative of the energy passed by filter 152 in two successive steps.

Because the center frequencies of the passbands of filter 152 are not tuned to coincide with the center of the data channels in the FDM band, the energy passed at each step of filter 152 can vary widely in level. The differences between each pair of adjacent levels is successively obtained by difference circuit 184 and applied via amplifier 186 to capacitor 188. Capacitor 188 integrates the output voltage of difference circuit 184 during the 4-second sampling period and at some point exceeds the preset reference level of comparator 192. When such occurs, a Logic 1 signal is applied to the Set input of flip-flop 196, indicating the presence of FSK data in the FDM band.

At the end of each 4-second sampling period, the two-phase clock 26 of FIG. 1 applies a pulse to output line 28. This pulse is received by one-shot 198 in FIG. 4 and a brief toggle pulse is applied to the toggle input of flip-flop 196. The Logic 1 appearing at the Set input of flip-flop 196 is clocked to its Q output. Thus, a Logic 0 is clocked to its $\overline{Q}$ output and appears on output line 200.

When FSK data is not being applied to input line 150, capacitor 188 cannot attain a voltage level equal to that of the reference input of comparator 192. As an example, assume noise is being applied to line 150. The energy level of noise across the FDM band is substantially constant. Both inputs to difference circuits 184 will be of substantially the same value and only a small difference voltage can thus be applied to capacitor 188. The voltage accumulated thereon cannot reach the preset level of comparator 192. A Logic 0 is applied to the Set input of flip-flop 196. When toggled at the end of the sampling period, this flip-flop is cleared and output line 200 becomes a Logic 1.

Capacitor 188 is reset at the end of each sampling period, following the clocking or toggling of flip-flop 196. A convenient reset means is to use a second one-shot 202 which is triggered by the trailing edge of the output of one-shot 198. The output of one-shot 202 is connected as the reset input to gate 204. When one-shot 202 is actuated, it applies a pulse to open gate 204. A path to ground is now provided to discharge capacitor 188.

As here embodied, output line 200 is applied as an input to logic circuitry which is preferably used to provide an output indicative of the presence of noise or data. The output of this logic circuitry drives the two lamps 90 and 94 previously described in the embodiment of FIG. 1. In addition to the input applied on line 200, an input is also provided on line 96 from the output of decision circuits 18 and on line 86 from binary counter 84, both as previously described in FIG. 1. Line 200 is connected to the input of NOR gate 206. Line 86 is connected to the input of NOR gate 208, and line 96 is connected to the input of both of these NOR gates. The output of NOR gates 206 and 208 are connected to the input of NOR gate 210 and the output of this last NOR gate is applied to the input of inverter 212. The output of inverter 212 is connected to lamp 90 and also to one input of NOR gate 214. The other input to NOR gate 214 is obtained from input line 96, and its output is connected to lamp 94.

In operation, the output logic circuit of FIG. 4 is enabled only when decision circuit 18 of FIG. 1 applies a Logic 0 onto line 96, indicative of either data or noise being present. If a Logic 1 is instead applied to line 96 by decision circuit 18, neither Noise lamp 94 nor Data lamp 90 can become illuminated. This is because a Logic 1 on line 96 causes a Logic 0 ouput at NOR gate 214, and Noise lamp 94 stays dark. Also, a Logic 1 input signal on line 96 causes both NOR gates 206 and 208 to go to Logic 0. The output of NOR gate 210 thus assumes a Logic 1 which is inverted by inverter 212 to a Logic 0. Data lamp 90 also remains dark. Thus, line 96 must be put at a Logic 0 level, and then the final determination as to which one of noise or data is actually present at the input is determined by the signals applied on input lines 86 and 200. If the system of FIG. 1 is constructed to detect only data or noise, and not all four signal conditions, line 96 can be tied to a voltage which applies a permanent Logic 0 onto this line.

Assume first that line 86 goes to Logic 0 at the end of a sampling period indicative of data being present on the line. Two Logic 0 inputs to NOR gate 208 cause its output to go to Logic 1. The output of NOR gate 210 goes to Logic 0 which is inverted by inverter 212 to a Logic 1. Data lamp 90 becomes illuminated to show the presence of data at the input. The output of inverter 212 is also applied to NOR gaate 214 to hold its output at Logic 0, and lamp 94 stays dark. Thus, since the system of FIG. 1 has itself determined that data is present on the line, the system of FIG. 4 plays no part in the decision and it does not matter what type of output is obtained on line 200.

Assume now that line 86 goes to Logic 1 at the end of the sampling period. As described previously in regard to FIG. 1, this would ordinarily be an indication of the presence of noise at the input (assuming of course that line 96 is at Logic 0). Because of the possibility that FSK modulated data might in fact be actually present at the input and improperly classified as noise by the signal on line 86, the signal on line 200 must also be considered to see whether this determination of the presence of noise is to be superseded by the operation of the system of FIG. 4.

Assume first that line 200 has a Logic 1 signal which is applied at the end of the 4-second sampling period. The output of NOR gate 206 is thus a Logic 0. At NOR gate 208, line 86 is at Logic 1 and the output of this NOR gate is also a Logic 0. Two Logic 0 inputs to NOR gate 210 causes its output to go to Logic 1 which is inverted by inverter 212 to a Logic 0. Lamp 90 remains dark. Two Logic 0's are now applied to the input of NOR gate 214 and its output goes to Logic 1. Noise lamp 94 becomes illuminated and the decision of the system of FIG. 1 has been confirmed by the decision of the system of FIG. 4.

Assume next that with the application of a Logic 1 output on line 86 by binary counter 84 (FIG. 1), the sytem of FIG. 4 applies a Logic 0 output on line 200. The output of NOR gate 206 goes to a Logic 1 and this causes the output of Nor 210 to go to a Login 0. This Logic 0 output is inverted to a Logic 1 and illuminates Data lamp 90. The output of inverter 212 also holds the output of NOR gate 214 to a Logic 0 and lamp 94 cannot become illuminated. Thus, the determination by FIG. 4 that FSK modulated data is in fact what has actually been applied to the input of the system has superseded the decision made by FIG. 1 that noise was present. The Logic 0 output applied on line 200 is seen to override the Logic 1 signal applied on line 86, and the Data lamp 90 is properly illuminated.

It will be apparent to those skilled in the art that various modifications and variations can be made in the systems of the present invention without departing from the scope or spirit of the invention.

We claim:

1. A system for distinguishing between noise and data signals in a communication line comprising:

a. means for providing a pulse train in response to excursions from a predetermined amplitude level in the signals applied to said communication line, b. means for sampling the pulse train at a varying rate and retaining temporarily the pulses which are sampled, c. means for selectively comparing the pulses retained in said sampling means during the sampling of the pulse train to determine whether there is an occurrence of predetermined digital states of the selected sampled pulses, said pulse comparison occurring repetitively, d. means for measuring the occurrences of said predetermined digital states of said selected sampled pulses as determined by said comparing means, e. means responsive to the signal in the communication line for detecting the energy contained in said signals at a plurality of spaced frequencies in the frequency band of the data signals, f. means for comparing the level of the detected energy with a predetermined energy level, and g. means responsive to said measuring means and said energy level comparing means for providing an output indicative of the presence of data or noise in the communication line as determined by a predetermined magnitude of occurrences of predetermined digital states of said selected sampled pulses and a predetermined energy level in said detected energy.

2. A system as claimed in claim 1 wherein said detecting means comprises:

a. means for passing the energy contained in said signals at a plurality of spaced frequencies in the frequency band of the data signals, and b. a difference circuit for comparing the energy passed by said passing means at said plurality of frequencies.

3. A system as claimed in claim 2 wherein said detecting means further comprises:

a. means connected to said difference circuit for accumulating a voltage in response to the difference in energy level passed at selected frequencies, and said comparing means includes:

b. a comparator for comparing the voltage of said accumulating means with a preset voltage level.

4. A system as claimed in claim 3 wherein said energy passing means comprises:

a. a variable filter for passing a plurality of spaced bands of frequencies, and b. means for varying said filter to permit the passing of a plurality of spaced bands of frequencies within the frequency band of the data signals.

5. A system as claimed in claim 4 wherein said detecting means further comprises:

a. a sample-and-hold circuit for sampling each level of the energy passed by said variable filter, and wherein:

b. said difference circuit is connected to the output of said sample-and-hold circuit and to the output of said variable filter, thereby to compare adjacent output levels of said filter.

6. A system for distinguishing between noise and data signals in a communication line comprising:

a. means for providing a pulse train in response to excursions from a predetermined amplitude level in the signals applied to said communication line, b. means for providing timing pulses at a varying rate, c. means connected to receive the pulse train and timing pulses for sampling the pulse train at a varying rate in response to receipt of said timing pulses, and retaining temporarily the pulses which are sampled, d. means for selectively comparing the pulses retained in said sampling means during the sampling of the pulse train to determine whether there is an occurrence of predetermined digital states of the selected sampled pulses, said pulse comparison occurring repetitively, e. means for measuring the occurrences of said predetermined digital states of said selected sampled pulses as determined by said comparing means, f. a timer for establishing a sampling period of predetermined duration, g. means responsive to the signals in the communication line for detecting the energy contained in said signals at a plurality of spaced frequencies in the frequency band of the data signals, h. means for comparing the level of the detected energy with a predetermined energy level, and i. means responsive to said measuring means and said energy level comparing means for indicating the presence of data or noise in the communication line as determined during a sampling period by a predetermined magnitude of occurrences of predetermined digital states of said selected sampled pulses and a predetermined energy level in said detected energy.

7. A system as claimed in claim 6 wherein said detecting means comprises:

a. means for passing the energy contained in said signals at a plurality of spaced frequencies in the frequency band of the data signals, and b. a difference circuit for comparing the energy passed by said passing means at said plurality of frequencies.

8. A system as claimed in claim 7 wherein said detecting means further comprises:

a. means connected to said difference circuit for accumulating a voltage in response to the difference in energy level passed at selected frequencies, and said comparing means includes:

b. a comparator for comparing the voltage of said accumulating means with a preset voltage level.

9. A system as claimed in claim 8 wherein said energy passing means comprises:

a. a variable filter for passing a plurality of spaced bands of frequencies, and b. means for varying said filter to permit the passing of a plurality of spaced bands of frequencies within the frequency band of the data signals.

10. A system as claimed in claim 9 wherein said detecting means further comprises:

a. a sample-and-hold circuit for sampling each level of the energy passed by said variable filter, and wherein:

b. said difference circuit is connected to the output of said sample-and-hold circuit and to the output of said variable filter, thereby to compare adjacent output levels of said filter.

* * * * *